United States Patent [19]

Gamon et al.

[11] Patent Number: 4,816,506

[45] Date of Patent: Mar. 28, 1989

[54] AQUEOUS SILICONE DISPERSIONS

[75] Inventors: Norbert Gamon, Seevetal; Karl Braunsperger, Burghausen; Otto Schneider, Burghausen, all of Fed. Rep. of Germany

[73] Assignee: Wacker-Chemie GmbH, Munich, Fed. Rep. of Germany

[21] Appl. No.: 114,925

[22] Filed: Oct. 30, 1987

[30] Foreign Application Priority Data

Nov. 6, 1986 [DE] Fed. Rep. of Germany ........ 3637836

[51] Int. Cl.$^4$ ............................................... C08K 5/35
[52] U.S. Cl. .......................................... 524/96; 524/99; 524/123; 524/155; 524/157; 524/158; 524/174; 524/175; 524/176; 524/177; 524/178; 524/186; 524/188; 524/262; 524/265; 524/317; 524/588; 524/375; 524/415; 524/730; 524/779; 524/783; 524/785; 524/780; 524/791

[58] Field of Search ............... 524/155, 157, 158, 123, 524/174, 175, 176, 177, 178, 186, 188, 262, 265, 317, 588, 730, 415, 375, 96, 99, 783, 780, 785, 779, 791

[56] References Cited

U.S. PATENT DOCUMENTS

| | | | |
|---|---|---|---|
| 4,221,688 | 9/1980 | Johnson et al. | 524/251 |
| 4,244,849 | 1/1981 | Saam | 524/442 |
| 4,247,811 | 1/1984 | Elias et al. | 524/96 |
| 4,590,220 | 5/1986 | Bauman et al. | 524/588 |

Primary Examiner—Melvyn I. Marquis

[57] ABSTRACT

Aqueous silicone dispersions containing (a) polydiorganosiloxanes having hydroxyl groups in the terminal units, (b) (organo)metallic compound(s), (c) a siliconate, and optionally, (d) a silicone resin.

These aqueous silicone dispersions will cure to form elastomeric coatings or sealants when the water is removed by evaporation.

7 Claims, No Drawings

AQUEOUS SILICONE DISPERSIONS

The present invention relates to aqueous silicone dispersions and more particularly to aqueous silicone dispersions containing hydroxyl-terminated polyorganosiloxanes, (organo)metallic compounds and siliconates, which upon removal of the water, will cure to form elastomeric coatings or sealants.

BACKGROUND OF THE INVENTION

Aqueous silicone dispersions containing hydroxylated polydiorganosiloxanes, colloidal silica and an organic amine or sodium hydroxide are described in U.S. Pat. No. 4,221,688 to Johnson et al. The dispersions are stable on storage in a pH range of from 9 to 11.5 and may be used after storing for at least 1 to 3 days.

U.S. Pat. No. 4,244,849 to Saam describes aqueous silicone dispersions which are obtained by adding an alkali metal silicate to an anionically stabilized aqueous emulsion of a polydiorganosiloxane having hydroxyl terminal groups. The dispersions prepared in accordance with the examples have pH values in the range of from 10.1 to 11.2.

It is an object of the present invention to provide aqueous silicone dispersions which may be used immediately after preparation without prolonged storage. Still another object of the present invention is to prepare aqueous silicone dispersions which are stable even in lower pH ranges, for example, around the neutral point. A further object of the present invention is to provide silicone-based aqueous coating systems and sealing compounds, which after evaporation of the water, cure on substrates to which they have been applied to form elastomeric coatings or sealing compounds that adhere well to substrates.

SUMMARY OF THE INVENTION

The foregoing objects and others, which will become apparent from the following description are accomplished in accordance with this invention, generally speaking, by providing an aqueous silicone dispersion containing (a) polydiorganosiloxanes having hydroxyl groups in the terminal units, (b) (organo)metallic compound(s), (c) at least one siliconate, and optionally (d) a silicone resin.

The aqueous silicone dispersion may be cured upon evaporation of the water to form elastomeric coatings or sealants.

DESCRIPTION OF THE INVENTION

The polydiorganosiloxanes which can be used in the dispersions of this invention and have hydroxyl groups in the terminal units may be represented by the formula

 (I), where R represents the same or different hydrocarbon radicals having from 1 to 18 carbon atoms which may be substituted by halogen atoms, amino groups, ether groups, ester groups, epoxy groups, mercapto groups, cyano groups or (poly)glycol radicals, which are derived from oxyethylene and/or oxypropylene units, and n is an integer of at least 200.

The polydiorganosiloxanes represented by formula (I) above are either emulsified directly or prepared only in the emulsion, by polymerization or condensation of low-molecular weight cyclic or linear, hydroxy-terminated polyorganosiloxanes. These processes are well known in the art. Up to about 10 percent of the siloxane units shown in formula (I) can be replaced by units of the formulas $R_3SiO_{\frac{1}{2}}$ or $RSiO_{3/2}$, where R is the same as above, as more or less unavoidable impurities.

Examples of hydrocarbon radicals represented by R are alkyl radicals, such as the methyl, ethyl, n-propyl, isopropyl, n-butyl, sec-butyl, t-butyl, n-pentyl, neopentyl, isopentyl, hexyl, heptyl, octyl, decyl, dodecyl and octadecyl radicals; alkenyl radicals such as the vinyl and allyl radicals; aryl radicals such as the phenyl and naphthyl radicals; aralkyl radicals such as the benzyl radical and α- and β-phenylethyl radicals; alkaryl radicals, such as the o-, m- and p-tolyl radicals and xylyl radicals; and araryl radicals such as the biphenylyl radicals.

Examples of substituted hydrocarbon radicals represented by R are halogenated radicals such as the 3-chloropropyl radical, the 3,3,3-trifluoropropyl radical, chlorophenyl radicals, and hexafluoropropyl radicals such as the 1-trifluoromethyl-2,2,2-trifluoroethyl radical; the 2-(perfluorohexyl)ethyl radical, the 1,1,2,2-tetrafluoroethyloxypropyl radical, the 1-trifluoromethyl-2,2,2-trifluoroethyloxypropyl radical, the perfluoroisopropyloxyethyl radical and the perfluoroisopropyloxypropyl radical; radicals substituted by amino groups, such as the N-(2-aminoethyl)-3-aminopropyl radical, the 3-aminopropyl radical and the 3-(cylohexylamino)-propyl radical; ether-functional radicals, such as the 3-methoxypropyl radical and the 3-ethoxypropyl radical; cyano-functional radicals such as the 2-cyanoethyl radical; ester-functional radicals such as the methacryloxypropyl radical; epoxy-functional radicals such as the glycidoxy-propyl radical; and sulfur-functional radicals such as the 3-mercaptopropyl radical.

Hydrocarbon radicals having from 1 to 10 carbon atoms are the preferred R radicals.

It is preferred that at least 80 percent, and more preferably, at least 90 percent of the R radicals be methyl radicals.

Preferably, the average value of the number n in formula (I) is selected such that the polydiorganosiloxane of formula (I) has a viscosity of more than 1,000 mPa.s, and more preferably more than 10,000 mPa.s at 25° C.

The (organo)metallic compounds which can be used as condensation catalysts for the dispersions of this invention are especially the salts of carboxylic acids and the halides of the metals Pb, Zn, Zr, Ti, Sb, Fe, Cd, Sn, Ba, Ca and Mn. (Organo-)tin compounds of carboxylic acids having from 1 to 18 carbon atoms and (organo-)tin halides, especially organo-tin naphthenates, octoates, hexoates, laurates, acetates, bromides and chlorides are the preferred catalytic compounds.

Specific examples of (organo-)tin compounds are tin(II) octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate and trioctyltin acetate. Diorganotin dicarboxylates, especially dibutyltin dilaurate, dioctyltin dilaurate, dibutyltin diacetate and dioctyltin diacetate are the preferred (organo-)tin compounds.

Siliconates which can be used in the dispersions of this invention are preferably those of the formula

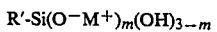 (II), and/or condensation products thereof formed by the elimination of water, where R' is the same as R. Preferably, R' is a hydrocarbon radical which has from 1 to 10 carbon atoms and may be halogenated or contain an amine group. More preferably, R' is a hydrocarbon radical having from 1 to 6 carbon atoms or an aminoalkyl radical; m is a whole or fractional number having a value of from 0.1 to 3 and M is an alkali metal cation or an ammonium or phosphonium group.

The examples of radicals mentioned above for R are equally applicable as examples for radicals represented by R'.

Preferred examples of radicals represented by R' are the same radicals mentioned above as examples of hydrocarbon radicals for R, except for the dodecyl, octadecyl, naphthyl and biphenylyl radicals, and also halogenated radicals such as the 3,3,3-trifluoropropyl radical, hexafluoropropyl radicals, the 1-trifluoromethyl-2,2,2-trifluoroethyl radical, the 2-(perfluorohexyl)-ethyl radical, the 3-chloropropyl radical and amino-substituted radicals. Examples of more preferred radicals represented by R' are alkyl radicals, such as the methyl, ethyl, n-propyl, isopropyl, n-butyl, sec-butyl, t-butyl and n-hexyl radical as well as the other hexyl radicals; alkenyl radicals such as the vinyl and allyl radicals; as well as the phenyl radical, the N-(2-aminoethyl)-3-aminopropyl radical, the 3-aminopropyl radical and the 3-(cyclohexylamino)-propyl radical.

Preferably, m is a number having a value of from 0.5 to 3, and more preferably, from 1 to 3.

Examples of radicals represented by M are the cations of the alkali metals, such as those of lithium, sodium, potassium, rubidium and cesium and radicals of the formula $$\oplus NR''_4 \quad (III)$$

or $$\oplus PR''_4 \quad (IV),$$

where R'' represents the same or different radicals, especially hydrocarbon radicals having from 1 to 6 carbon atoms.

Preferably, Na+, K+ and $NR\oplus_4$ are the preferred radicals represented by M.

It is possible to use only one type of siliconate or a mixture of at least two or more such siliconates may be employed in this invention.

The dispersions of this invention are, in general, stabilized by means of emulsifiers. Cationic, anionic, ampholytic and non-ionic emulsifiers can be used. These emulsifiers and their amounts are familiar to one skilled in the art. One type of emulsifier, for example, an anionic emulsifier, or mixtures of at least two types of emulsifiers, such as a mixture of at least one anionic emulsifier with at least one non-ionic emulsifier can be used. The emulsifiers can be added as such to the mixture to be dispersed or as a dispersion to the mixture to be stabilized, and they can also be formed from a precursor, for example, the corresponding acid, base or a salt of the actual emulsifier, in the mixture to be dispersed or to be stabilized as a dispersion.

Preferably, at least one anionic emulsifier is present in the dispersion of this invention.

The anionic emulsifiers are preferably salts of surface-active sulfonic acids, such as described in U.S. Pat. No. 3,294,725 to Findlay et al, where the surface-active sulfonic acids and salts are used in an emulsion polymerization to form diorganosiloxanes having hydroxyl groups in the terminal units. The alkali metal or ammonium salts of the sulfonic acids are preferred, especially the potassium salts. Examples of sulfonic acids are aliphatically substituted benzenesulfonic acids, aliphatically substituted naphthalenesulfonic acids, aliphatic sulfonic acids, silylalkylsulfonic acids and aliphatically substituted diphenyl ether-sulfonic acids. Other anionic emulsifiers which can be used are, for example, alkali metal sulforicinoleates, sulfonated glycerol esters of fatty acids, salts of sulfonated monohydric alcohol esters, amides of aminosulfonic acids, for example, the sodium salt of oleylmethyltauride, alkali metal salts of sulfonated aromatic hydrocarbons, such as sodium alpha-naphthalene monosulfonate, condensation products of naphthalene sulfonic acids with formaldehyde and sulfates such as ammonium lauryl sulfate, triethanolamine lauryl sulfate and sodium lauryl ether sulfate.

Non-ionic emulsifiers are preferably used in addition to the anionic emulsifiers. Examples of non-ionic emulsifiers are saponins, addition products of fatty acids with ethylene oxide, such as dodecanoic acid esters with tetraethylene oxide, addition products of ethylene oxide with sorbitan trioleate, ethylene oxide addition products of phenolic compounds having side chains, such as addition products of ethylene oxide with isodecylphenol, and imine derivatives such as polymerized ethyleneimine and addition products of alcohols with ethylene oxide, such as polyethylene glycol-(10) isotridecyl ether.

Examples of cationic emulsifiers are fatty amines, quaternary ammonium compounds and quaternary compounds of pyridine, morpholine and imidazoline.

Examples of ampholytic emulsifiers are long-chain substituted amino acids, such as N-alkyl-di-(aminoethyl)glycine and N-alkyl-2-aminopropionate, and also betaines such as (3-acylaminopropyl)-dimethylglycine and alkylimidazolium betaines.

Even though it is not essential, it is preferred that a silicone resin be used in the dispersions of this invention. The addition of a silicone resin improves the strength of the elastomer obtained from the dispersions of this invention after the solvent has been evaporated.

Preferably, the silicone resins are those having units of the formula

$$R_x''SiO_{(4-x)/2} \quad (V),$$

where R'' is the same as in formulas (III) and (IV), and x is a number having an average value of from 0.5 to 1.6, and more preferably from 0.75 to 1.4.

The silicone resin can contain up to 10 percent by weight of Si-bonded hydroxyl groups and/or alkoxy groups, even though these are not shown in formula (V).

Preferably, the R'' radicals in formula (V) are methyl, ethyl, vinyl and phenyl radicals, especially methyl radicals.

It is preferred that the dispersion of this invention contain from 0.01 to 20, and more preferably from 0.5 to 6 parts by weight of siliconate, from 0.01 to 10, and more preferably from 0.15 to 7 parts by weight of (organo)metallic compound(s) and from 0 to 150, and more preferably from 0 to 70 parts by weight of silicone resin, based on 100 parts by weight of polydiorganosiloxanes having hydroxyl groups in the terminal units.

The amount of emulsifier employed for stabilizing the dispersions of this invention depends to a great extent on the composition of the particular dispersion. Generally, the amount of emulsifier ranges from about 1 to 20 percent by weight based on the weight of the dispersion, except for the water component.

The silicone dispersion of this invention may contain other constituents for modifying the properties of the dispersions, or of the elastomeric products obtained from these dispersons. Adhesion promoters can be added to improve the adhesion of the elastomers obtained from the dispersions of this invention, after evaporation of the solvent, to the substrate upon which the dispersions have been applied. The use of amino-functional silanes, such as N-(2-aminoethyl)-3-aminopropyl-trialkoxysilanes, in which the alkoxy radical is a methoxy, ethoxy, n-propoxy or isopropoxy radical, has proved to be beneficial in promoting adhesion of the resultant elastomers to substrates.

Additional substances which may be present in the dispersions of this invention are plasticizers, such as $\alpha,\omega$-trimethylsiloxypolydimethylsiloxanes, foam inhibitors, organic solvents, thixotropic and dispersing agents and fillers. Examples of thixotropic agents are carboxymethylcellulose and polyvinyl alcohol. Examples of dispersing agents are polyacrylic acid salts and polyphosphates. The thixotropic and dispersing agents have in some cases emulsifying properties, so that they can also be used as emulsifiers. Examples of organic solvents which may be used are hydrocarbons, such as petroleum ethers having various boiling ranges, n-pentane, n-hexane, a mixture of hexane isomers, toluene and xylene. The organic solvents are preferably used in an amount which does not exceed about 5 percent by weight, based on the weight of the dispersion, and more preferably the organic solvent is omitted altogether. Examples of fillers which may be employed are reinforcing fillers, that is, fillers having a BET surface area of at least 50 $m^2/g$, such as pyrogenically produced silica, precipitated silica, alumina and carbon black; nonreinforcing fillers, such as, fillers having a BET (Brunauer, Emmet and Teller) surface area of less than 50 $m^2/g$, such as clay, ground quartz, chalk, mica, zinc oxide, titanium dioxide and many others. Generally, the fillers are used in an amount up to about 150 parts by weight, based on 100 parts by weight of organopolysiloxane having hydroxyl groups in the terminal units.

The dispersions of this invention may be made up of one substance from each of the groups of components mentioned above or a mixture of at least two different substances from each of the groups of components described above. Thus, for example, a mixture of at least two organopolysiloxanes having hydroxyl groups in the terminal units can be used in the dispersions of this invention.

The dispersions of the present invention preferably have pH values of from 5 to 13, preferably from 6 to 11 and more preferably from about 7 to 8.5, as determined by a commercial glass electrode dipped into the dispersion.

A solids content of over 80 percent by weight is obtained in the dispersions of this invention. By solids content, we mean the fraction by weight of all the constituents of the dispersion, except for water, and if used, organic solvent(s) in the total weight of the dispersion. Preferably, the solids content of the dispersions of this invention range from about 20 to 85 percent by weight. Lower solids contents are, of course, possible, but are not economically attractive. Preferably, the polydiorganosiloxanes containing hydroxyl groups in the terminal units, used as starting materials in the dispersions of this invention and silicone resins, if used, are emulsified or dispersed in water before mixing with the other components. This can also be of advantage for the (organo)metallic compound(s).

Unless otherwise stated, the amounts specified in the following examples are by weight unless otherwise specified. The emulsifier used was, inter alia, polyethylene glycol-(10) isotridecyl ether. Unless otherwise stated, the examples given below were carried out under a pressure of 0.10 mPa (abs.) and at room temperature, that is to say about 22° C., or at the temperature being established on addition of the reactants at room temperature without additional heating or cooling.

(A) Emulsion of polydiorganosiloxane having hydroxyl groups in the terminal units (1) An emulsion was prepared containing 1400 g of an $\alpha,\omega$-dihydroxypolydimethylsiloxane having a viscosity of 100 $mm^2 \times s^{-1}$ at 25° C., 30 g of emulsifier (polyethylene glycol(10) isotridecyl ether), 30 g of dodecylbenzenesulfonic acid and 540 g of water. After storing for 20 hours at room temperature, the emulsion was neutralized with diethylamine. The viscosity of the oil phase was about 1,000,000 $mm^2 \times s^{-1}$ at 25° C.

(2) An emulsion was prepared in accordance with (A-1), except that diethanolamine was substituted for diethylamine in the neutralization.

(3) An emulsion was prepared in accordance with (A-1), except that a 40 percent by weight aqueous potassium methylsiliconate solution was substituted for diethylamine in the neturalization.

(4) An emulsion was prepared in accordance with (A-1), except that a 50 percent by weight aqueous potassium hydroxide solution was substituted for diethylamine in the neutralization.

(B) Dispersion of (organo)metallic compound

An emulsion was prepared containing 50 g of dibutyltin dilaurate, 5 g of emulsifier (polyethylene glycol-(10) isotridecyl ether) and 45 g of water.

(C) Silicone resin dispersion

An emulsion was prepared containing 50 g of a low-molecular weight silicone resin consisting of units of the formula $CH_3SiO_{3/2}$, 3 g of dodecylbenzenesulfonic acid salt and 47 g of water and then acidified with 1 g of dodecylbenzenesulfonic acid. After storing for 1 week at room temperature, the emulsion was neutralized with N-methylethanolamine.

(D) Plasticizer emulsion

An emulsion was prepared containing 700 g of an $\alpha,\omega$-bis-trimethylsiloxypolydimethylsiloxane having a viscosity of 100 $mm^2 \times s^{-1}$ at 25° C., 30 g of emulsifier (polyethylene glycol(10) isotridecyl ether) and 270 g of water.

EXAMPLE 1

A mixture was prepared containing 20 g of the emulsion prepared in accordance with (A-2) above, 0.2 g of the dibutyltin dilaurate emulsion prepared in (B) above, and 0.1 g of a 40 percent by weight aqueous potassium methylsiliconate solution and stored for 1 day at room temperature. The pH of the resultant dispersion was 8.0. A portion of this dispersion was applied to a glass plate. Within one day, a dry, soft elastomeric film formed and after 4 days had a Shore-00 hardness of 46.

EXAMPLE 2

The procedure of Example 1 was repeated, except that 5 g of the silicone resin dispersion prepared in accordance with (C) above were introduced into the mixture. The pH value of the resultant dispersion was 8.5. A part of this dispersion was applied to a glass plate. Within one day, a dry, soft elastomeric film formed which after 4 days had a Shore-00 hardness of 52.

EXAMPLE 3

(a) About 60 g of precipitated chalk were mixed into a dispersion containing 100 g of the emulsion prepared in accordance with (A-1) above, 1 g of the dibutyltin dilaurate emulsion (B), 25 g of the silicone resin dispersion (C) and 0.5 g of a 40 percent by weight aqueous potassium methylsiliconate solution. A creamy, firm paste which had a pH value of 8.5 was obtained, which was storage stable for at least 6 months at room temperature. Within one day after applying as a bead or as a 2 mm thick sheet, the paste cured to form a dry elastomer.

(b) The paste prepared in accordance with the procedure described in Example 3(a) was treated with 10 g of the plasticizer emulsion (D). The pH of the resultant paste was 8.0.

(c) The paste prepared in accordance with Example 3(a) was treated with 1 g of N-(2-aminoethyl)-3-aminopropyltrimethoxysilane. The pH of the resultant paste was 8.5. The paste was applied to wet concrete, raw wood, varnished wood and many other substrates and cured to an elastomer. The elastomer exhibited excellent adhesion in each case to the particular substrate. The physical properties of the elastomers, obtained by applying the pastes prepared in Examples (a), (b) and (c) as 2 mm thick sheets, after storage for 1 week at room temperature are shown in Table 1.

TABLE 1

| Compound Prepared In Accordance With Example 3 | Shore A Hardness | Tensile Strength in N/mm | Tensile Strength at 100% | Elongation Break in % | Tear at Propagation Resistance in N/mm |
|---|---|---|---|---|---|
| (a) | 27 | 0.9 | 0.3 | 810 | 3.9 |
| (b) | 18 | 1.0 | 0.2 | 950 | 3.6 |
| (c) | 32 | 1.2 | 0.4 | 600 | 10 |

EXAMPLE 4

About 60 g of ground quartz were mixed with a dispersion containing 100 g of the emulsion prepared in accordance with (A-3), 1 g of the dibutyl-tin dilaurate emulsion (B) and 25 g of the silicone resin dispersion (C). A creamy, firm paste having a pH of 6.0 was obtained. Within one day after applying as a bead or as a 2 mm thick sheet, the paste cured to form a soft, dry elastomer.

COMPARATIVE EXAMPLE

Example 3(a) was repeated, except that 0.5 g of potassium water glass (40 percent by weight solids content) was substituted for the aqueous potassium siliconate solution. The paste did not cure after one day after being applied as a bead or as a 2 mm thick sheet.

The pastes prepared in accordance with Example 3(a) and the comparison example were each applied, 4 days after their preparation, as beads to various substrates, pressed briefly on the substrates and then completely vulcanized for 9 days at room temperature. The elastomers were each about 10 mm wide and about 7 mm high. In order to determine the adhesion, an attempt was made to peel the elastomers from the substrate. The results are shown in Table 2.

TABLE 2

| | Adhesion Test | |
| Substrate | Example 3(a) | Comparison Example |
|---|---|---|
| Concrete, dry | − | − |
| Concrete, wet | + | − |
| Aluminum | + | − |
| Zinc sheet | +/− | − |
| Glass | + | − |

− Adhesion tear (the entire elastomer can be peeled from the substrate.
+ Cohesion tear (tear within the elastomer).

EXAMPLE 5

(a) Preparation of an aqueous solution of potassium N-(2-aminoethyl)-3-aminopropylsiliconate About 111 g of N-(2-aminoethyl)-3-aminopropyltrimethoxysilane were metered with vigorous stirring into a solution containing 95.5 g of potassium hydroxide in 400 g of water. First methanol and then about 200 ml of water are distilled off from the mixture by heating. The mixture was then made up to a total weight of 367 g by addition of water. The resultant solution is a 40 percent by weight siliconate solution.

(b) About 60 g of ground quartz were mixed into a dispersion containing 100 g of the dispersion prepared in accordance with Example (A-4), 1 g of the dibutyltin dilaurate emulsion (B), 25 g of the silicone resin dispersion (C) and 0.5 g of the 40 percent aqueous potassium N-(2-aminoethyl)-3-aminopropylsiliconate solution prepared in accordance with Example 5(a) above. A creamy, firm paste having a pH value of 8.5 was obtained. Within one day after being applied as a bead or as a 2 mm thick sheet, the paste cured to form a dry elastomer.

What is claimed is:

1. An aqueous silicone dispersion containing (a) polydiorganosiloxanes having hydroxyl groups in the terminal units, (b) an (organo)metallic compound selected from the group consisting of metal salts of carboxylic acids and metal halides, in which the metal is selected from the group consisting of Pb, Zn, Zr, Ti, Sb, Fe, Cd, Sn, Ba, Ca and Mn, and (c) at least one siliconate of the formula $$R'-Si(O^-M^+)_m(OH)_{3-m} \qquad (II),$$

and/or condensation products thereof formed by elimination of water, in which R' is selected from the group consisting of hydrocarbon radicals having from 1 to 18 carbon atoms and hydrocarbon radicals having from 1 to 18 carbon atoms which are substituted with groups selected from the class consisting of halogen atoms, amino groups, ether groups, ester groups, epoxy groups, mercapto groups, cyano groups and (poly)-glycol radicals, which contain oxyethylene and/or oxypropylene units, m is an integer or fractional number having a value of from 0.1 to 3, and M is selected from the group consisting of an alkali metal cation, an ammonium group and a phosphonium group.

2. The aqueous silicone dispersion of claim 1, wherein the dispersion also contains (d) a silicone resin having the formula $$R''_x SiO_{(4-x)/2}$$

where R" is a hydrocarbon radical having from 1 to 6 carbon atoms and x has an average of from 0.5 to 1.6.

3. The aqueous silicone dispersion of claim 1, wherein the dispersion contains from 0.01 to 10 parts by weight of an (organo)metallic compound (b), and from 0.01 to 20 parts by weight of the siliconate (c), based on 100 parts by weight of the polydiorganosiloxanes(a).

4. The aqueous silicone dispersion of claim 2, wherein the dispersion contains up to 150 parts of silicone resin (d), based on 100 parts by weight of the polydiorganosiloxanes (a).

5. A process for preparing the aqueous solution dispersion of claim 1, wherein an aqueous emulsion containing (a) polydiorganosiloxanes having hydroxyl groups in the terminal units are mixed with (b) an (organo)metallic compound selected from the group consisting of metal salts of carboxylic acids and metal halides, in which the metal is selected from the group consisting of Pb, Zn, Zr, Ti, Sb, Fe, Cd, Sn, Ba, Ca and Mn, and (c) an aqueous solution of a siliconate of the formula $$R'-Si(O^-M^+)_m(OH)_{3-m} \qquad (II),$$

and/or condensation products thereof formed by elimination of water, where R' is selected from the group consisting of hydrocarbon radicals having from 1 to 18 carbon atoms and hydrocarbon radicals having from 1 to 18 carbon atoms which are substituted with groups selected from the class consisting of halogen atoms, amino groups, ether groups, ester groups, epoxy groups, mercapto groups, cyano groups and (poly)-glycol radicals, which contain oxyethylene and/or oxypropylene units, m is an integer or fractional number having a value of from 0.1 to 3, and M is selected from the group consisting of an alkali metal cation, an ammonium group and a phosphonium group.

6. The process of claim 5, wherein an aqueous dispersion of silicone resin (d) having the formula $$R''_xSiO_{(4-x)/2},$$

where R" is a hydrocarbon radical having from 1 to 6 carbon atoms and x has an average of from 0.5 to 1.6 is added to the aqueous silicone dispersion.

7. The process of claim 5, wherein the (organo)-metallic compound (b) is dispersed in water before it is mixed with the polydiorganosiloxane(a).

* * * * *